US007558804B1

(12) United States Patent
Polydov

(10) Patent No.: US 7,558,804 B1
(45) Date of Patent: Jul. 7, 2009

(54) METHOD, APPARATUS, AND COMPUTER-READABLE MEDIUM FOR SPACE-EFFICIENT STORAGE OF VARIABLES IN A NON-VOLATILE COMPUTER MEMORY

(75) Inventor: Feliks Polydov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 679 days.

(21) Appl. No.: 11/212,198

(22) Filed: Aug. 26, 2005

(51) Int. Cl.
G06F 17/00 (2006.01)
G06F 17/30 (2006.01)
G06F 13/00 (2006.01)
(52) U.S. Cl. .................... 707/102; 707/100; 707/206; 711/104; 711/156
(58) Field of Classification Search .............. 707/1, 707/100–102, 103 R, 103 Z, 206; 711/117–118, 711/102–105, 112, 165–166, 156; 713/1–6; 379/88.28, 83; 719/312
See application file for complete search history.

(56) References Cited

U.S. PATENT DOCUMENTS

| 5,592,669 | A | * | 1/1997 | Robinson et al. | ............ 707/206 |
| 5,594,903 | A | * | 1/1997 | Bunnell et al. | ............. 717/162 |
| 5,802,539 | A | * | 9/1998 | Daniels et al. | ............. 715/236 |
| 6,591,328 | B1 | * | 7/2003 | Iida et al. | .................... 711/103 |
| 6,606,628 | B1 | * | 8/2003 | Monsen et al. | ............. 707/100 |
| 6,732,267 | B1 | * | 5/2004 | Wu et al. | ................... 713/100 |
| 6,907,524 | B1 | * | 6/2005 | Huntington et al. | ........ 713/164 |
| 6,968,439 | B2 | * | 11/2005 | Wong et al. | ................. 711/170 |
| 7,483,875 | B2 | * | 1/2009 | McKay et al. | ................. 707/3 |
| 2003/0073497 | A1 | * | 4/2003 | Nelson | ........................ 463/42 |
| 2003/0154368 | A1 | * | 8/2003 | Stevens et al. | ................. 713/1 |
| 2003/0188173 | A1 | * | 10/2003 | Zimmer et al. | ............. 713/189 |
| 2004/0186975 | A1 | * | 9/2004 | Saha | ......................... 711/170 |
| 2004/0225106 | A1 | * | 11/2004 | Van Dijken et al. | ......... 528/397 |

(Continued)

FOREIGN PATENT DOCUMENTS

EP 0874318 * 10/1998

(Continued)

OTHER PUBLICATIONS

Extensible Firmware Interface Specification, Version 1.10, Chapter 6 (Dec. 1, 2002).

Primary Examiner—Srirama Channavajjala
(74) Attorney, Agent, or Firm—Hope Baldauff Hartman, LLC

(57) ABSTRACT

A method, apparatus, and computer-readable medium for storing variables in a non-volatile computer memory are provided. The computer-readable medium has a data structure stored thereon that includes a first data field for storing a variable record including a header and variable information. The data structure also includes a second data field for storing a GUID for the variable. The variable record may comprise a full record or a data only record. A full record contains all of the identifying information for the record and the variable value. A data only record includes only an updated value for the variable. When a request is received to retrieve the variable value, the data structure is searched to locate the most recently created record for the variable. The value stored in this record is then returned in response to the request. Periodically, a garbage collection process may be performed to reduce the records stored for each variable to a single full record.

5 Claims, 9 Drawing Sheets

U.S. PATENT DOCUMENTS

| | | | |
|---|---|---|---|
| 2005/0166087 A1* | 7/2005 | Gorobets | 714/7 |
| 2006/0041738 A1* | 2/2006 | Lai | 713/2 |
| 2008/0028200 A1* | 1/2008 | Polyudov | 713/2 |

FOREIGN PATENT DOCUMENTS

| | | | |
|---|---|---|---|
| WO | WO 00/58839 | * | 10/2000 |
| WO | WO 03/054697 | * | 7/2003 |
| WO | WO 2006/121251 | * | 11/2006 |
| WO | WO 2006/133597 | * | 12/2006 |
| WO | WO 2007/044541 | * | 4/2007 |
| WO | WO 2007/076623 | * | 7/2007 |

* cited by examiner

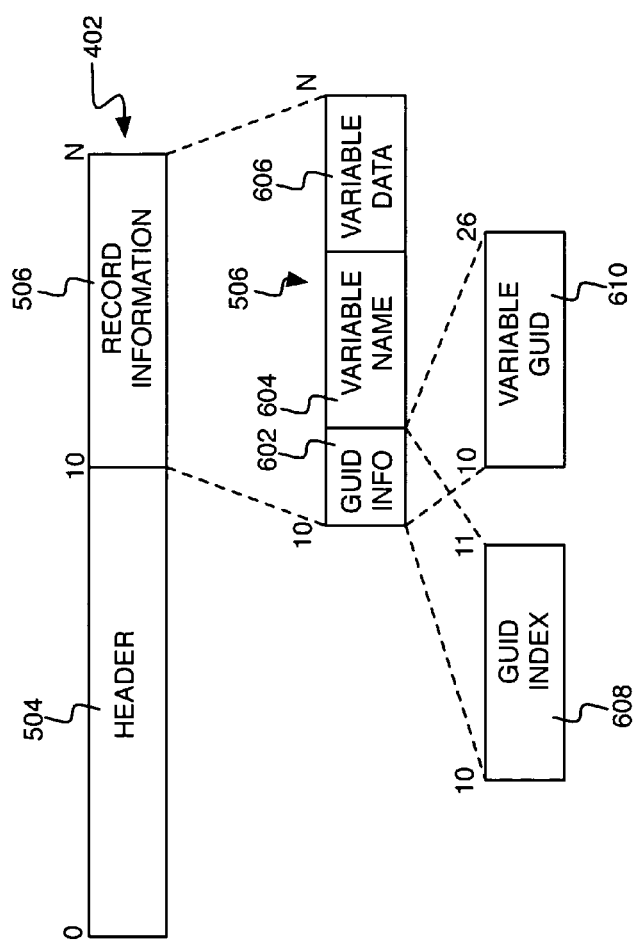
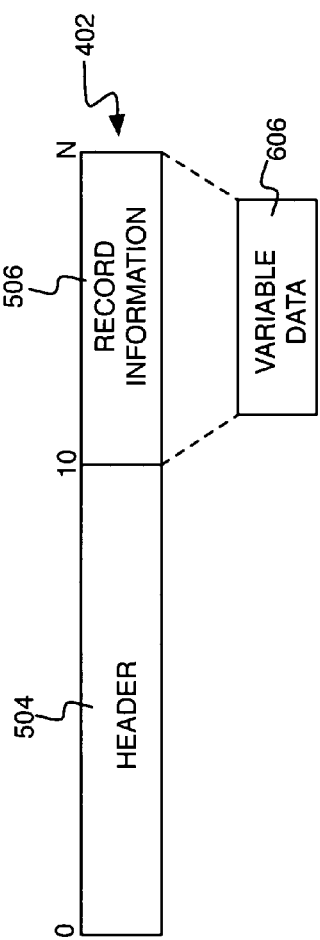

METHOD, APPARATUS, AND COMPUTER-READABLE MEDIUM FOR SPACE-EFFICIENT STORAGE OF VARIABLES IN A NON-VOLATILE COMPUTER MEMORY

TECHNICAL FIELD

The present invention is related to the storage of variables in a computer memory. More particularly, the present invention is related to efficiently storing variables in a non-volatile computer memory.

BACKGROUND OF THE INVENTION

In many computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

The EFI is capable of providing services to other applications. Services are implemented by modules that may be loaded by a boot loader when the EFI is started. The services may provide low level input output services, mass storage device access services, simple text output services, and others. Each of these modules may have a need to store and retrieve various types of variables. As a result, the EFI specification requires that a service also be provided for storing and retrieving variables. Variables are defined as key/value pairs that consist of identifying information plus attributes (the key) and arbitrary data (the value). Variables within the EFI platform are intended for use as a means to store data that is passed between the EFI environment in the platform and EFI OS loaders and other applications that run in the EFI environment. The EFI specification does not define how the variable services should be implemented.

The EFI specification also specifies that variables must be persistent in most cases. This implies that the EFI implementation on a platform must operate so that variables passed in for storage are retained and available for use each time the computer system boots, at least until they are explicitly deleted or overwritten. In many computer systems, a non-volatile random access memory ("NVRAM") is utilized to persistently store data such as system configuration information. The NVRAM may also be utilized to store variables between system boots in an EFI environment. However, the amount of NVRAM typically available in a computer system is very limited. Accordingly, it is necessary to make efficient use of available NVRAM when storing EFI variables. Moreover, because erase operations take a long time to perform on non-volatile memory devices, it is necessary to reduce the amount of erase operations during the variable storage and retrieval process.

It is with respect to these considerations and others that the various embodiments of the invention have been made.

SUMMARY OF THE INVENTION

In accordance with the present invention, the above and other problems are solved by providing a method, computer-readable medium, and apparatus for space-efficient storage of variables in a non-volatile computer memory. Through the embodiments of the invention, variables may be persisted to a non-volatile memory of a computer system so that the variables are available for use between boots of the computer system in a manner that efficiently utilizes a limited quantity of non-volatile memory.

According to one aspect of the invention, a computer-readable medium is provided having stored thereon a data structure for use in storing variables in a non-volatile memory. The data structure includes a first data field for storing a variable record that includes header and variable information for a variable. The data structure also includes a second data field for storing a globally unique identifier ("GUID") for the variable. According to embodiments, all or a portion of a non-volatile memory may be allocated for storing the first and second data fields. The first data fields may be stored starting at the beginning of the allocated area and the second data fields may be added in reverse order from the end of the allocated area. In this manner, as first and second data fields are stored in the allocated memory area, they are added toward the middle of the allocated portion of non-volatile memory.

According to other aspects of the invention, a variable record may comprise a full record or a data only record. When a variable is first written to the non-volatile memory, a full record is created that contains all of the identifying information for the record. When the variable is subsequently updated, a data only record is written to the non-volatile memory with only the updated value for the variable. When a request is received to retrieve the variable value, the data structure is searched to locate the most recently created record for the variable. The value stored in this record is then returned in response to the request. Periodically, a garbage collection process may be performed to reduce the records stored for each variable to a single full record. Storage and maintenance of the variable data in this manner eliminates many costly non-volatile memory erase operations.

According to other aspects of the invention, the header may include a data field for storing a unique signature for the first data field. Data stored in this field may be utilized to distinguish the variable record information from other types of data stored in the non-volatile memory. The header may also include a data field for storing the size of the data stored in the record. Utilizing data contained in the signature and size fields, the entire contents of each variable record and the next record may be identified. The header may also include a data field for storing an offset to a next record. This field is utilized to store data necessary to locate any data only records for a variable. The header may also include a data field storing one or more flags for the variable.

According to aspects of the invention, the flags stored in the header may include a data field for storing data indicating whether the variable record is a full record or a data only record. The flags stored in the header may also include a data field for storing data indicating whether the variable referenced by the record is valid or has been deleted. The flags stored in the header may also include a data field for storing data indicating a lifespan of the variable stored in the record. For instance, the lifespan of a variable may be limited to the boot time of the computer system or may include both the boot time and run time of the computer system. The flags stored in the header may also include a data field for storing data indicating whether a name for the variable is expressed using ASCII or UNICODE data. The flags stored in the header may also include a data field for storing data for identifying a GUID for the variable. In particular, this flag may be utilized to indicate whether the GUID is stored in the record or in another location in the non-volatile memory.

According to embodiments of the invention, record information for a full record includes a data field for storing either the GUID for the record or an index to a GUID for the record stored in another location within the non-volatile memory. The record information for the full record may also include a data field for storing a name for the variable utilizing either ASCII or UNICODE values as specified by the appropriate flag. The record information for the full record may also include a data field for storing a value for the variable. The value is the actual value for the variable. The record information for a data only record only includes a data field for storing the value for the variable.

According to another aspect of the invention, a method is provided for storing a variable in a non-volatile memory. According to one method, a request is received to store a variable in the non-volatile memory. In response to the request, a determination is made as to whether a record already exists in the non-volatile memory for the variable. If a record does not already exist in the non-volatile memory, a new full record for the variable is created in the non-volatile memory. The full record includes a header and record information for the variable. The record information for the full record includes a data field for storing either the GUID for the record or an index to a GUID for the record stored in another location within the non-volatile memory. This data field is populated based upon whether a GUID has previously been stored for this or another variable. The record information for the full record may also include a data field for storing a name for the variable, and a data field for storing a value for the variable.

If it is determined that a record already exists in the non-volatile memory for the variable, a new data only record is created in the non-volatile memory for the variable. The data only record includes record information including a data field for storing the updated value for the variable. The previous record for the variable is also updated to include the offset to the newly created data only variable.

According to other aspects of the invention, a method is provided for retrieving the value of a variable stored in a non-volatile memory. According to the method, a request is received to retrieve the variable value. In response to the request, a full record for the variable stored in the non-volatile memory is located. A determination is then made, based upon the contents of the full record, whether a data only record exists for the variable. If any data only records exist, the most recently created data only record is located. The variable value stored in the most recently created data only record is retrieved and returned in response to the original request. If no data only records exist, the variable value is retrieved from the full record and returned in response to the request.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4-6 are data structure diagrams illustrating aspects of various data structures provided in the embodiments of the invention.

DETAILED DESCRIPTION OF THE INVENTION

Figure 1:
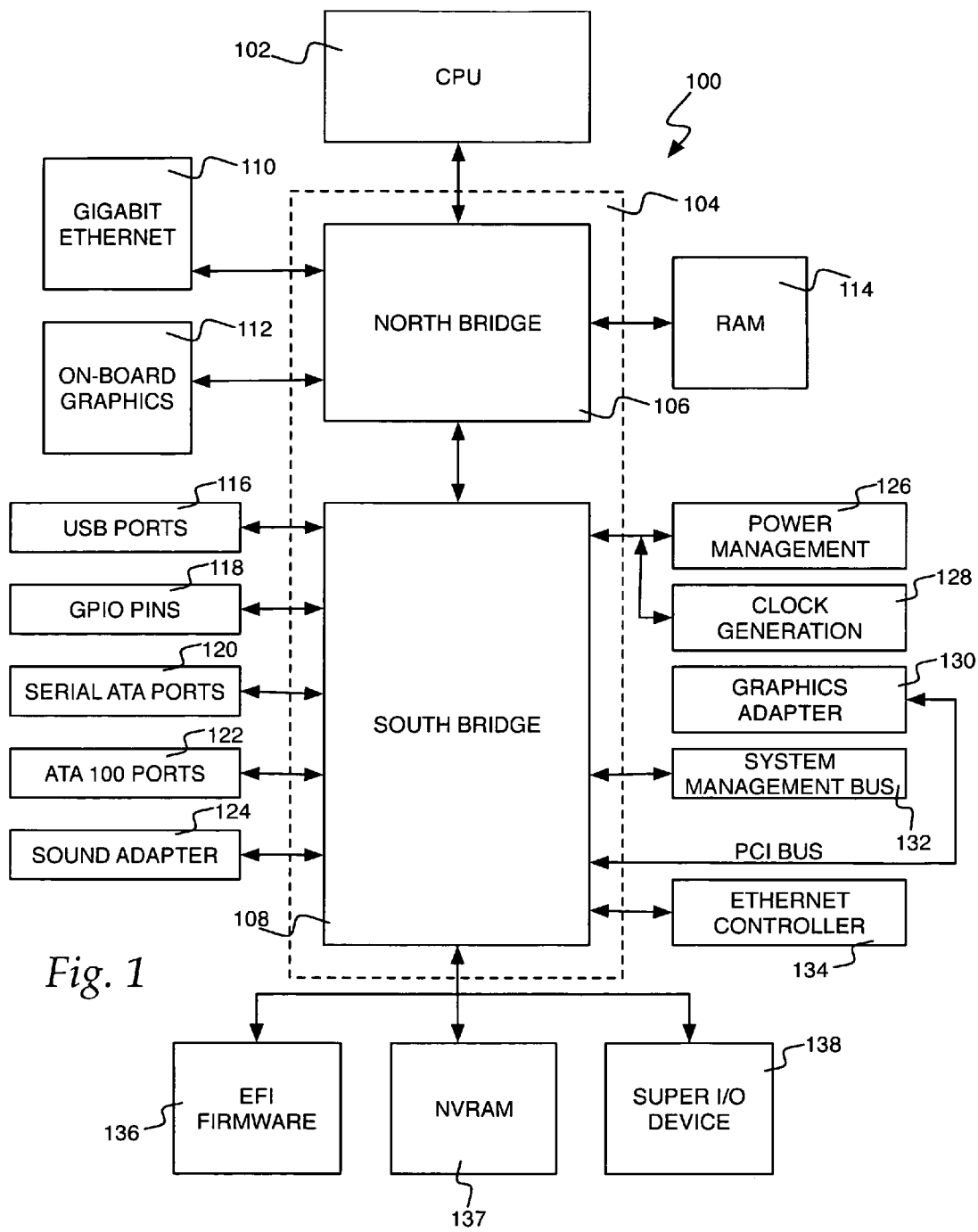
FIG. 1 is a computer architecture diagram showing aspects of a computer architecture utilized in the various embodiments of the invention.

Embodiments of the present invention provide methods, systems, apparatus, and computer-readable media for efficiently storing variables in a non-volatile memory. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to store variables in a non-volatile memory in order to persist the variable values between restarts of the computer 100.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a graphics adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing an extensible firmware interface ("EFI") firmware 136 that includes program code containing the basic routines that help to start up the computer 100 and to transfer information between elements within the computer 100. Additional details regarding the operation of the EFI firmware 136 is provided below with respect to FIGS. 2-3.

The LPC interface may also be utilized to connect a non-volatile random access memory ("NVRAM") 137 to the computer 100. The NVRAM 137 may be utilized by the EFI firmware 136 to store configuration data for the computer 100. According to embodiments of the invention, the NVRAM 137 may also be utilized by the EFI firmware 136 to store variables in a persistent manner. Additional details regarding the embodiments of the invention for storing variables in the NVRAM 137 are provided below with reference to FIGS. 4-9.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
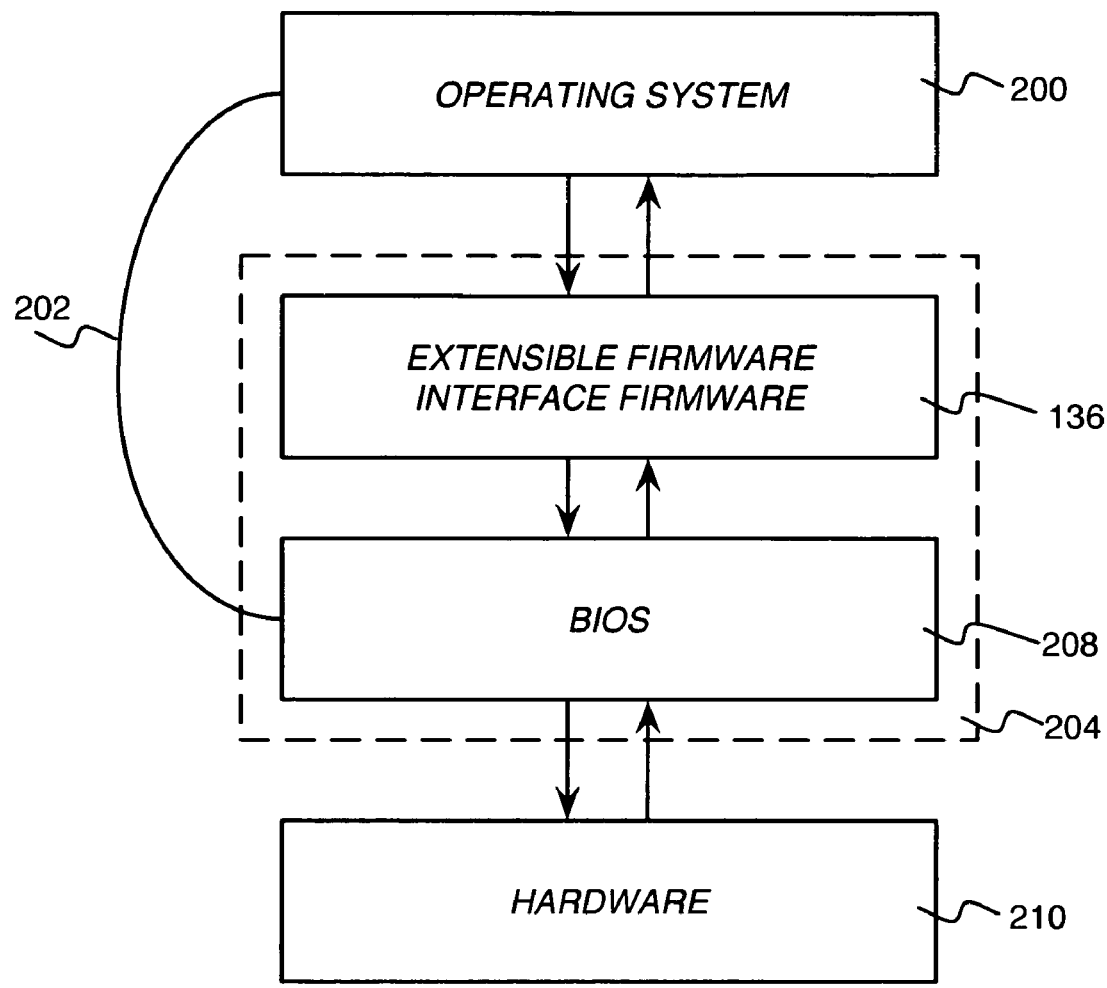
FIGS. 2 and 3 are computer hardware and software architecture diagrams illustrating aspects of an extensible firmware interface environment that provides an operating environment for the various embodiments of the invention.

Referring now to FIG. 2, additional details regarding the operation of the EFI firmware 136 of the computer 100 will be described. According to embodiments of the invention, the firmware may comprise a computer basic input output system ("BIOS") 208. As known to those skilled in the art, the BIOS of a PC-compatible computer provides an interface between the operating system 200 and the hardware 210 of the computer 100. Alternatively, the firmware may comprise an EFI firmware 136 compatible with the EFI specification from INTEL CORPORATION. The EFI specification describes an interface between the operating system 200 and the system firmware 136. The EFI specification defines the interface that platform firmware must implement, and the interface that the operating system 200 may use in booting. How the firmware 136 implements the interface is left up to the manufacturer of the firmware. The intent of the specification is to define a way for the operating system 200 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI firmware 136 and a BIOS 208 may be presented in the firmware. This allows users and system integrators to support both firmware interfaces. In order to provide this functionality, an interface 202 may be provided for use by legacy operating systems and applications. Additional details regarding the architecture and operation of the EFI firmware 136 are provided below with respect to FIG. 3. Moreover, additional details regarding the operation and architecture of EFI can be found in the EFI specification which is available from INTEL CORPORATION end expressly incorporated herein by reference. It should be appreciated that the firmware may include only a BIOS-compatible firmware or only an EFI-compatible firmware.

Figure 3:
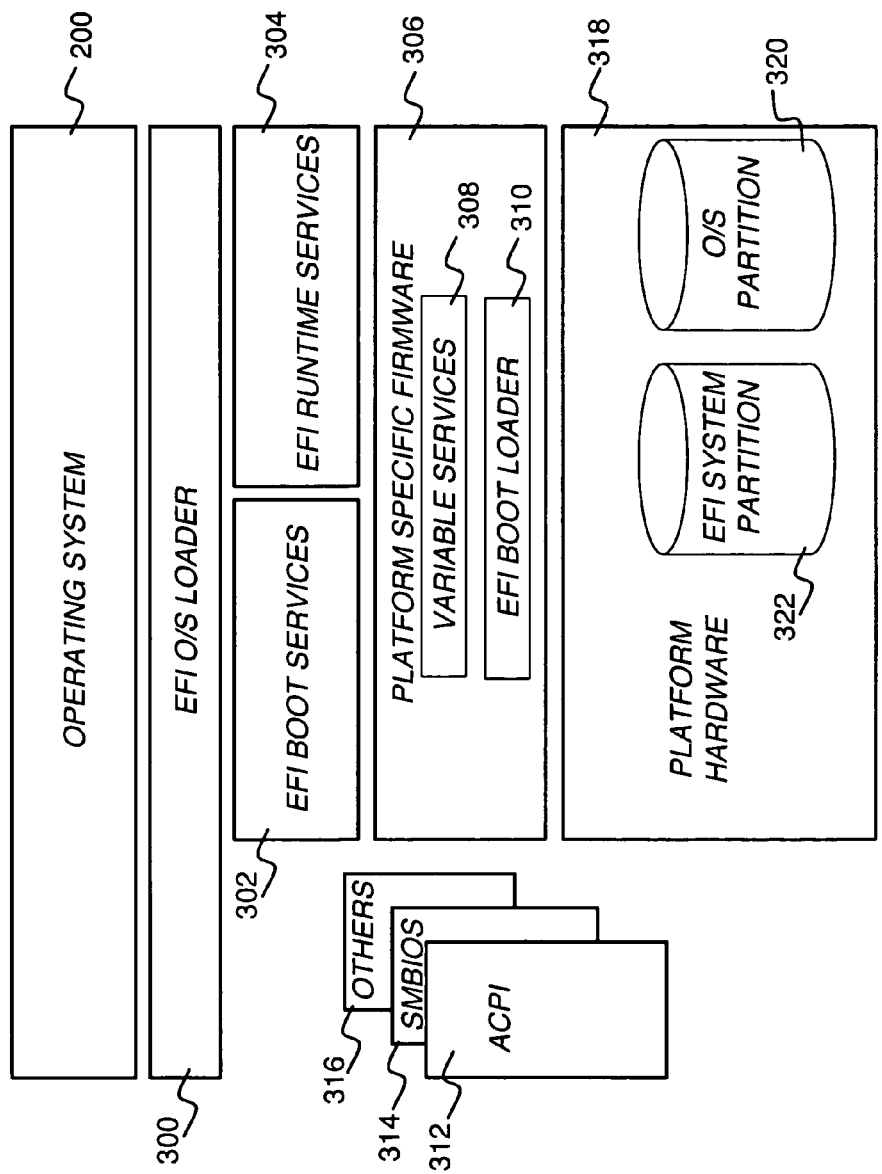

Turning now to FIG. 3, additional details regarding an EFI specification-compliant system utilized to provide an operating environment for the various embodiments of the invention will be described. As shown in FIG. 3, the system includes platform hardware 318 and an operating system 200. The platform firmware 306 may retrieve an OS image from the EFI system partition 322 using an EFI O/S loader 300. The EFI system partition 322 may be an architecturally shareable system partition. As such, the EFI system partition 322 defines a partition and file system that are designed to allow safe sharing of mass storage between multiple vendors. An O/S partition 320 may also be utilized.

Once started, the EFI O/S loader 300 continues to boot the complete operating system 200. In doing so, the EFI O/S loader 300 may use EFI boot services 302 and interfaces to other supported specifications to survey, comprehend, and initialize the various platform components and the operating system software that manages them. Thus, interfaces 312, 314, and 316, from other specifications may also be present on the system. For example, the Advanced Configuration and Power Management Interface ("ACPI") and the System Management BIOS ("SMBIOS") specifications may be supported.

EFI boot services 302 provides interfaces for devices and system functionality that can be used during boot time. EFI runtime services 304 may also be available to the O/S loader 300 during the boot phase. For example, a minimal set of runtime services may be presented to ensure appropriate abstraction of base platform hardware resources that may be needed by the operating system 200 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 310 at system boot time. The EFI boot loader 310 is a component in the EFI firmware that determines which program modules should be explicitly loaded and when. Once the EFI firmware is initialized, it passes control to the boot loader 310. The boot loader 310 is then responsible for determining which of the program modules to load and in what order.

The various program modules executing within the EFI may have a need to store variables in an easy to access and manage manner. Moreover, the EFI specification indicates that variables utilized by the EFI firmware must be capable of being stored in the NVRAM 137. In order to provide these facilities, the EFI firmware 136 includes a variable services module 308. The variable services module 308 provides an abstract interface for programs executing within the EFI firmware 136 to store and retrieve variables. In particular, variable services provides an interface for setting a variable, for retrieving a variable, and for retrieving the name and GUID of a next variable. Variables are defined as key/value pairs that consist of identifying information plus attributes (the key) and arbitrary data (the value). Variables may be identified by a name and a GUID, which is a 128-bit number in one embodiment of the invention.

The EFI specification also indicates that each variable has attributes that define lifecycle and visibility. In particular, three attributes may be utilized: EFI_VARIABLE_NON_VOLATILE, which specifies that a variable must be preserved between power-on cycles of the computer 100; EFI_VARIABLE_BOOTSERVICE_ACCESS, which specifies that a variable is accessible during the boot phase of the computer 100; and EFI_VARIABLE_RUNTIME_ACCESS, which specifies that the variable is accessible during both the boot phase of the computer 100 and the run time of the computer 100 when control has been passed to the operating system 100. In order to preserve the information about variables utilized within the EFI firmware 136 between power-on cycles, variable services utilizes a portion of the NVRAM 137. Details regarding the data structures and processes utilized by variables services 308 to provide efficient non-volatile storage of variables for programs executing within the EFI firmware 136 are provided below with respect to FIGS. 4-9.

Figure 4:
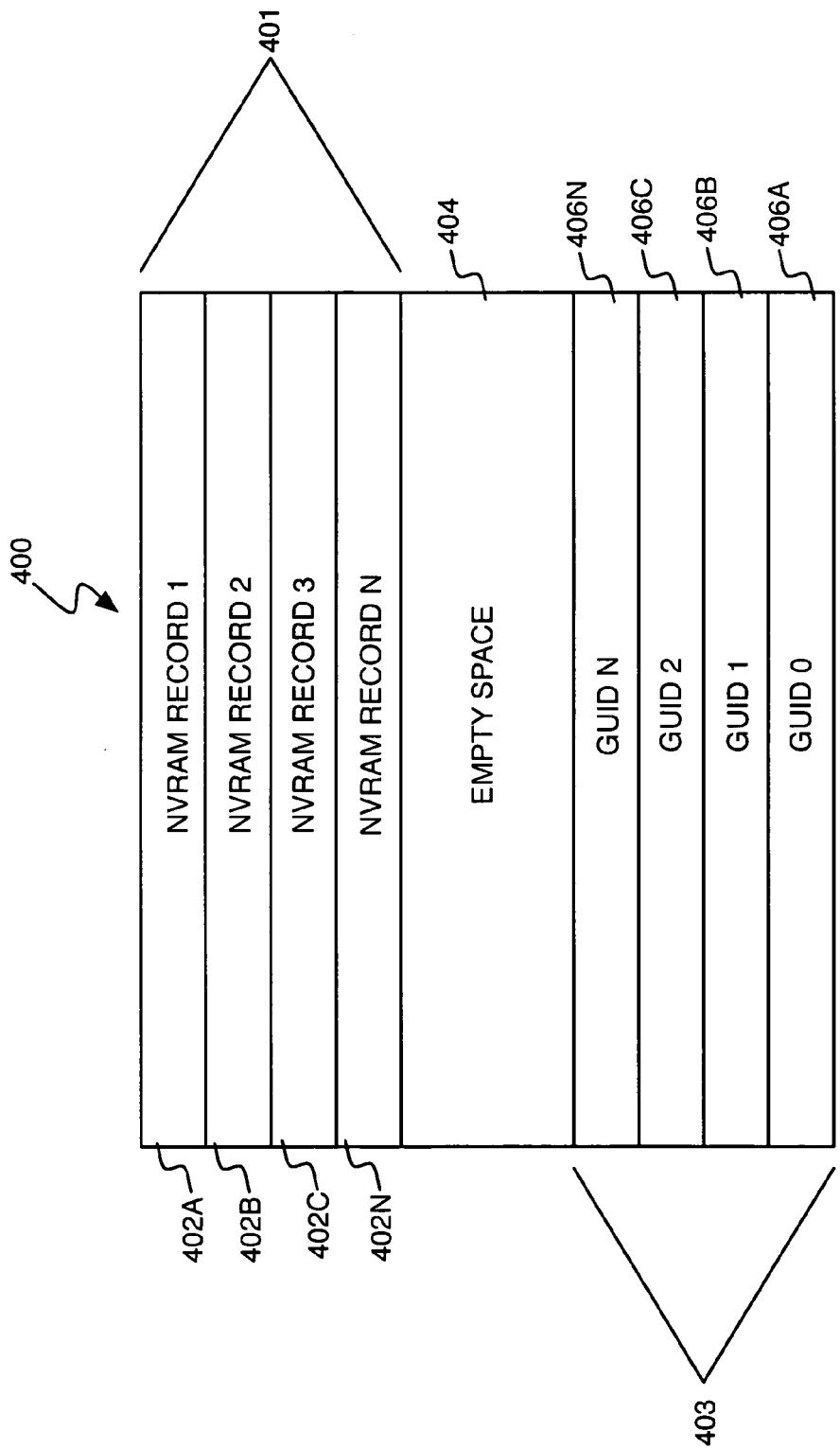

Referring now to FIG. 4, additional details regarding a data structure provided by the embodiments of the invention for storing variable records will be described. FIG. 4 illustrates an allocated area 400 of the NVRAM 137 that has been allocated for storage of variable data by an EFI firmware. It should be appreciated that all or only a portion of the NVRAM 137 may be allocated for this purpose. According to an embodiment of the invention, a portion 401 of the allocated area 400 is utilized to store variable records 402A-402N. These records are added from the beginning of the area 400 as variables are stored by the EFI firmware. A portion 403 is also allocated for storing GUIDs 406A-406N for the variables. The GUIDs 406A-406N are added from the end of the area 400. In this manner, variable records 402A-402N are added starting at the beginning of the area 400 while the GUIDs are added starting at the end of the area 400, thereby causing the portions 401 and 403 to grow toward one another. An empty space 404 may exist between the two portions 401 and 403. Additional details regarding the creation and deletion of variable records and their contents will be provided below with respect to FIGS. 5-9.

Because the GUIDs 406A-406N are added from the end of the area 400 and grow from upper to lower memory addresses, it is necessary to specify an index for a GUID utilizing an address calculated from the end of the area 400. In particular, the address of any GUID stored in the area 400 can be calculated as follows: GUIDAddress=NVRAM end−sizeof(GUID)*(GUIDIndex+1). It is assumed that the GUID Index begins at zero. In this manner, the address of each GUID can be calculated using only the index and the size of the GUID, in bytes.

Figure 5:
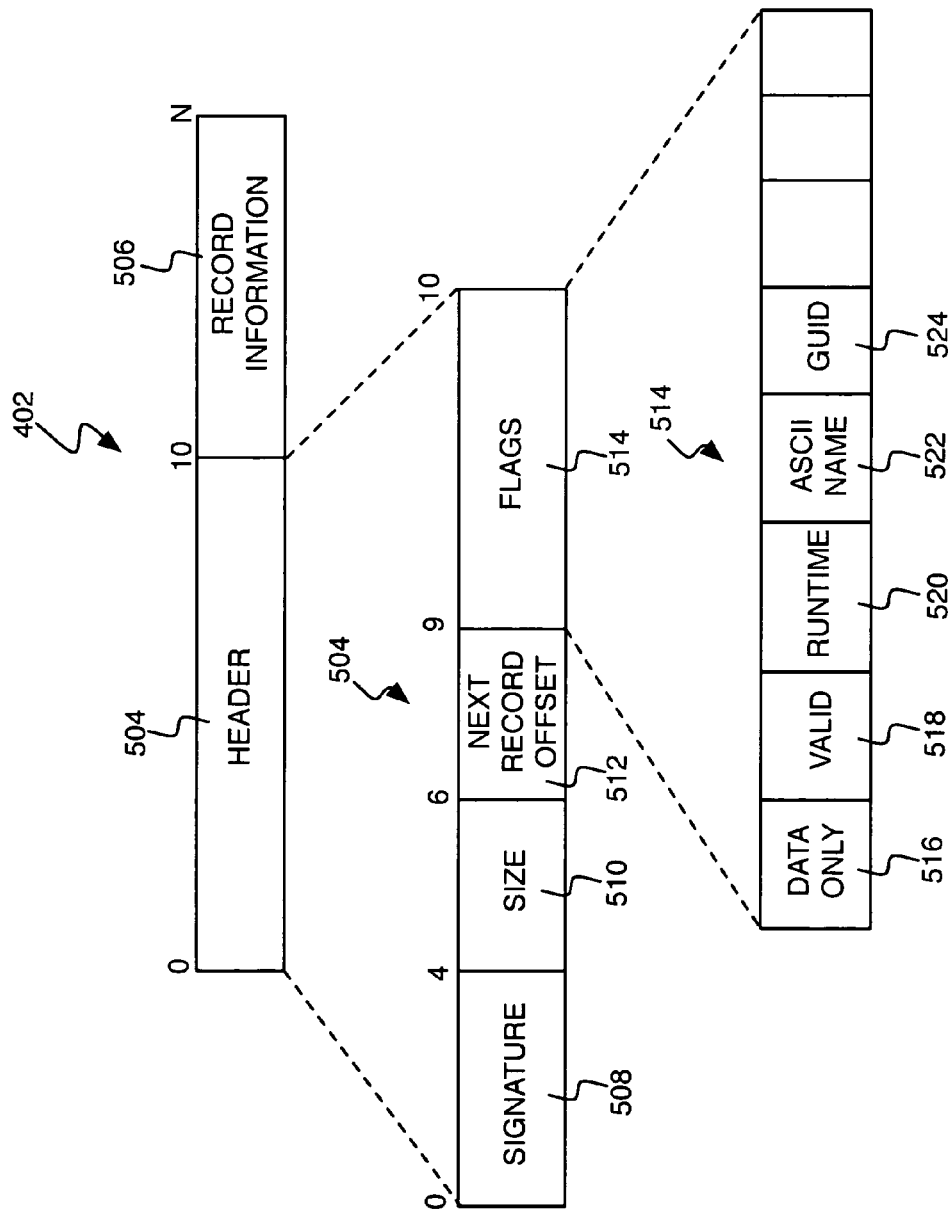

Turning now to FIG. 5, additional details regarding the format of a variable record 402 will be described. As discussed briefly above, a variable record 402 is created for each variable stored or updated in the NVRAM 137 by the EFI firmware. Variable records may comprise full records or data only records. Each time a new variable is stored in the NVRAM 137, a full record is created for the variable. When the variable is updated, a data only record is created. Full records and data only records consist of a header 504 and record information 506. The data that is stored in the record information 506 differs between full records and data only records. These differences will be described below with respect to FIG. 6. The format of the header 504 will be described here with respect to FIG. 5.

As shown in FIG. 5, the header 504 includes a data field 508 for storing a unique signature for the variable record 402. Data stored in the field 508 may be utilized to distinguish the variable record information from other types of data stored in the non-volatile memory. The header 504 also includes a data field 510 for storing the size of the variable record 402. Utilizing data contained in the data field 508 and the data field 510 (the signature and the size), the starting and ending locations for a variable record 402 may be identified. By using this data, the start and end of the various data fields described herein may also be located.

According to embodiments, the header 504 also includes a data field 512 for storing a byte offset to a next variable record. This field is utilized to store data necessary to locate any data only records for a variable. In this manner, a linked list consisting of a full record and zero or more data only records is created for each variable. The contents of the data field 512 is initialized to the erase polarity value of the NVRAM 137 (the value of the bits in the NVRAM 137 after erasure). During subsequent updates, the data field 512 is modified to the offset of the data only record that is created to store an updated value for the variable. In order to find the current value for the variable, the linked list is followed to locate the most recently added record. Additional details regarding the format of full and data only records will be provided below with respect to FIG. 6.

According to other embodiments of the invention, the header 504 also includes a data field 514 for storing one or more flags for the variable. According to aspects of the invention, the flags stored in the data field 514 may include a data field 516 for storing data indicating whether the variable record is a full record or a data only record. The flags stored in the data field 514 may also include a data field 518 for storing data indicating whether the variable referenced by the record is valid or has been deleted. The flags stored in the data field 514 may also include a data field 520 for storing data indicating a lifespan of the variable stored in the record. For instance, the lifespan of a variable may be limited to the boot time of the computer system or may include both the boot time and run time of the computer system. The flags stored in the data field 514 may also include a data field 522 for storing data indicating whether a name for the variable is expressed using ASCII or UNICODE data. The flags stored in the data field 514 may also include a data field 524 for storing data for identifying a GUID for the variable. In particular, this flag may be utilized to indicate whether the GUID is stored in the record itself or in another location in the non-volatile memory. Additional details regarding the use of the data field 524 are provided below with respect to FIG. 6.

Referring now to FIG. 6A, additional details regarding the format of the data structure utilized for a full record will be described. In particular, FIG. 6A illustrates a variable record having record information 506 corresponding to a full record.

According to embodiments of the invention, the record information 506 for a full record includes a data field 602 for storing either the GUID 610 for the record or an index 608 to a GUID for the record stored in another location within the non-volatile memory. In particular, the actual use of the data field 602 depends upon the contents of the data field 524, discussed above with respect to FIG. 5. In this manner, the GUID for a variable may be specified within the variable record itself, or may be stored in the portion 403 of the NVRAM and referenced using a pointer stored in the variable record. Referencing GUIDs utilizing a pointer allows storage space to be saved by only storing the GUID one time. Multiple variable records may then point to the same GUID stored in the portion 403.

The record information 506 for a full record may also include a data field 604 for storing a name for the variable. The name may be expressed utilizing either ASCII or UNICODE values. The contents of the data field 522 indicates whether the name was specified using ASCII or UNICODE values. The record information 506 for a full record also includes a data field 606 for storing the actual value of the variable.

Referring now to FIG. 6B, additional details regarding the format of the data structure utilized for a data only record will be described. In particular, FIG. 6B illustrates a variable record having record information 506 corresponding to a data only record. In particular, in a data only record the record information 506 comprises a single data field 606 for storing the value for the variable. Because the data only record does not include the data fields 602 and 604, it requires less storage space than a full data record. Additional details regarding the storage and use of the full and data only records is provided below with respect to FIGS. 7 and 8.

Figure 7:
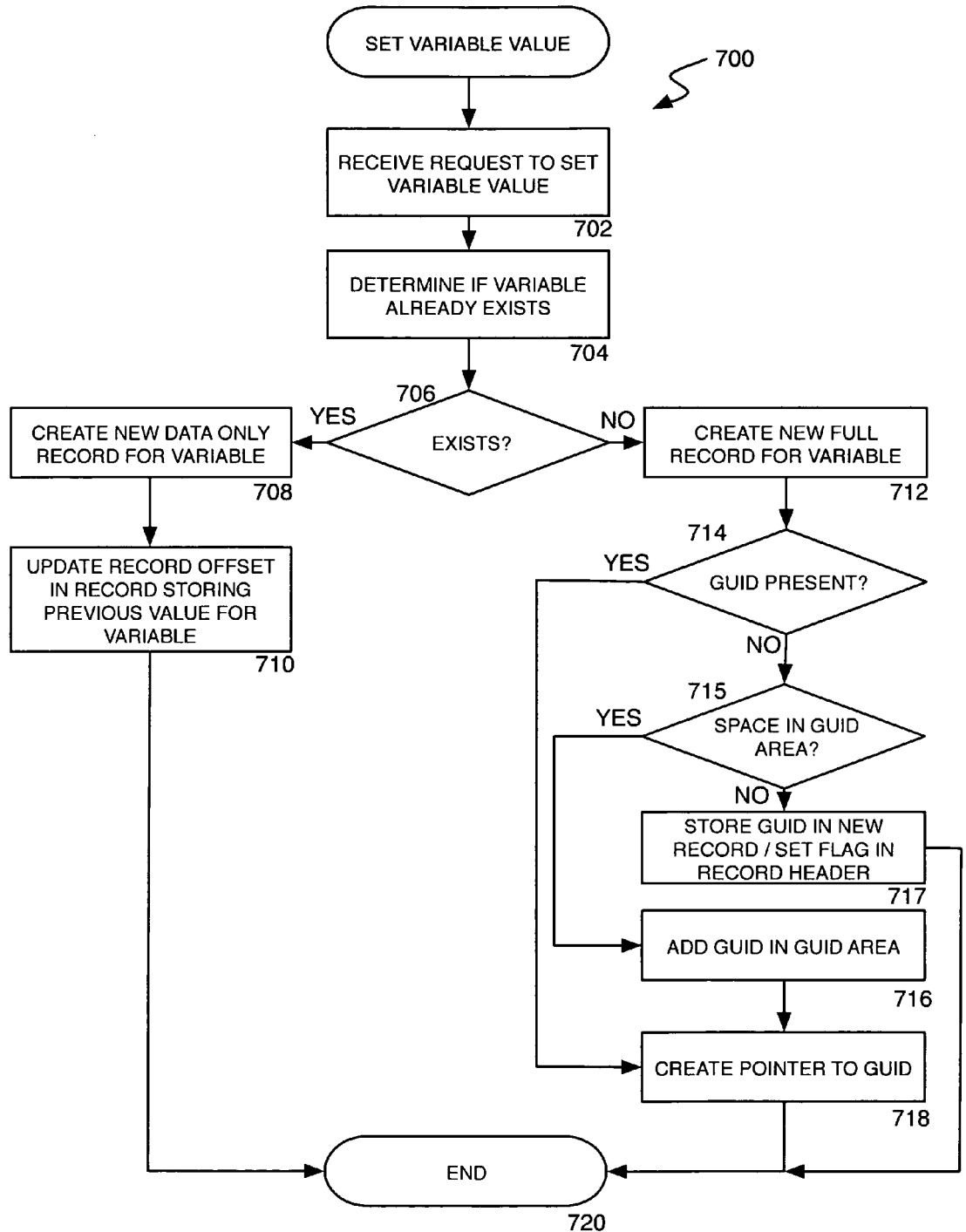
FIGS. 7-9 are flow diagrams showing aspects of various processes provided in the embodiments of the invention.

Turning now to FIG. 7, an illustrative routine 700 will be described illustrating the operation of the variable services module for setting the value of a variable stored in the non-volatile memory of the computer 100 according to one embodiment of the invention. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 7-9 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 700 begins at operation 702, where variable services 308 receives a request from another program executing within the EFI environment to store a variable in the NVRAM 137. The request may include a name, GUID, and a value for the variable. In response to receiving such a request, the routine 700 continues to operation 704, where variable services 308 determines whether a record already exists in the NVRAM 137 for the variable. This may be accomplished, for instance, by searching the NVRAM 137 for a variable record having the same name and GUID as the variable to be stored. At operation 706, a determination is made as to whether a matching variable record was found in the NVRAM 137.

If, at operation 706, it is determined that a matching record was found, the routine 700 branches from operation 706 to operation 708. At operation 708, a new data only record is created for the variable utilizing the updated data value in the data field 606. The format of the data only record is described above with respect to FIG. 6B. The routine 700 then continues to operation 710, where the value of the data field 512 for the previously created record for the variable is modified to reflect the appropriate offset to the newly created data only variable. In this manner, a new record is added to a linked list of records for the variable. From operation 710, the routine 700 continues to operation 720, where it ends.

If, at operation 706, it is determined that a matching record was not found, the routine 700 branches from operation 706 to operation 712. At operation 712, a new full record for the variable is created in the NVRAM 137. The full record includes a header 504 and a record 506 as shown in FIGS. 5 and 6A. Once the full variable record has been created at operation 712, the routine 700 continues to operation 714, where a determination is made as to whether a GUID for the variable was previously stored in the portion 403 of the NVRAM 137. If the GUID has already been stored, the routine 700 branches to operation 718, where a pointer to the proper GUID is stored in the data field 602 of the newly created record. If the GUID has not been previously stored in the portion 403, the routine 700 continues to operation 715 where a determination is made as to whether space exists in the portion 403 for a new GUID. Because a limited amount of space may be available for storing GUIDs in the portion 403, this determination must be made. If space is available in the portion 403, the new GUID will be stored there. Otherwise, the GUID will be stored in the newly created record.

If, at operation 715, it is determined that space exits in the portion 403 for a new GUID, the routine 700 branches from operation 715 to operation 716, where a new GUID is stored in the portion 403. The routine then continues from operation 716 to operation 718, where a pointer is stored in the data field 602 to the newly created GUID. If, at operation 715, it is determined that space does not exist in the portion 403, the routine 700 continues to operation 717, where the GUID is stored in the new record and where the appropriate flag is set in the record header thereby indicating that the GUID is stored in the record and not the portion 403. The routine 700 then continues from operations 717 and 718 to operation 720, where it ends.

Figure 8:
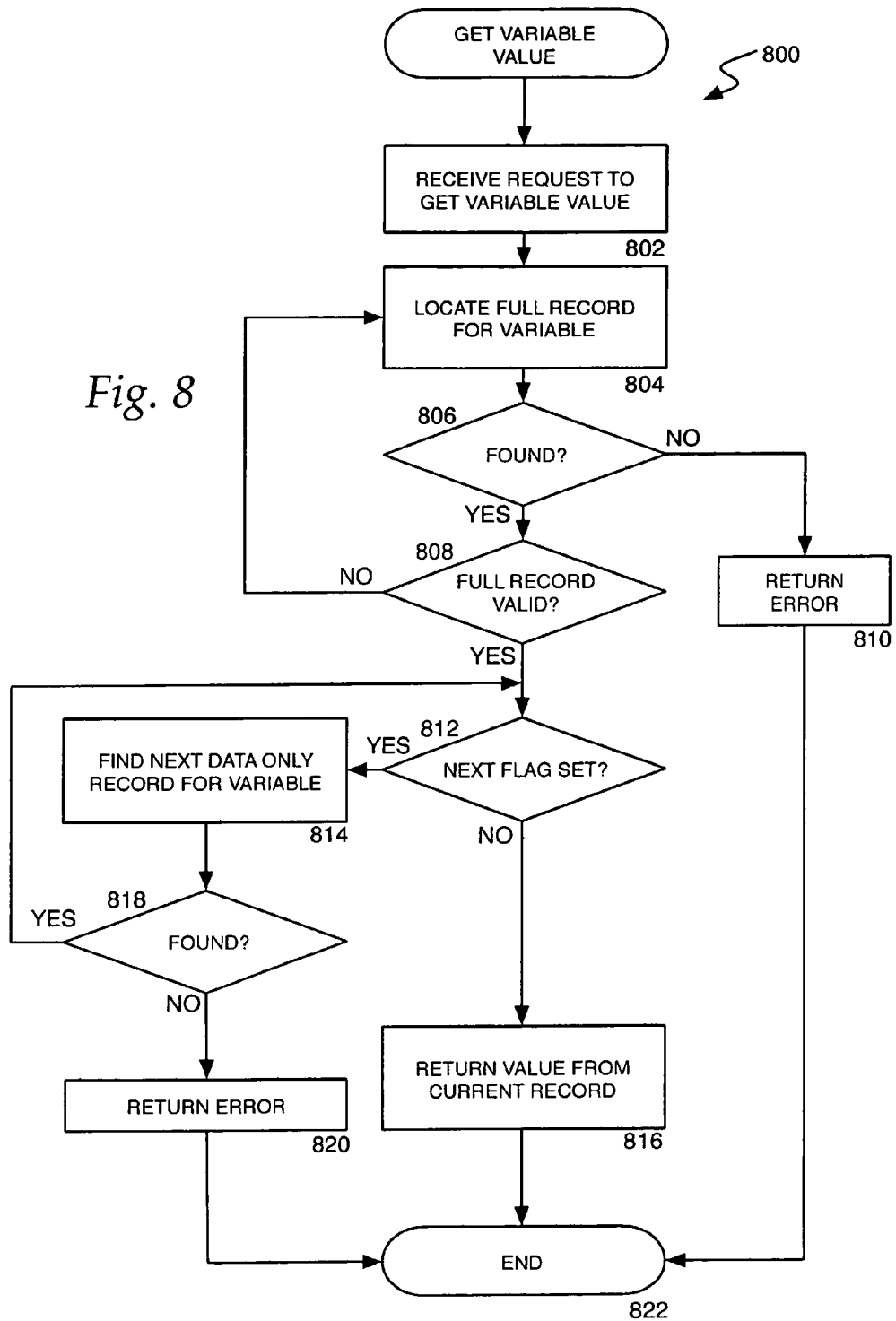

Turning now to FIG. 8, an illustrative routine 800 will be described for retrieving the value of a variable stored in a non-volatile memory. According to the method, variable services 308 receives a request to retrieve the value of a variable stored in the NVRAM 137 at operation 802. In response to the request, the routine 800 continues to operation 804, where variable services 308 attempts to locate the full record for the variable in the non-volatile memory. From operation 804, the routine 800 continues to operation 806, where a determination is made as to whether the requested record was found. If the record was not found, the routine 800 branches to operation 810, where an error is returned. From operation 810, the routine 800 continues to operation 822, where it ends.

If, at operation 806, it is determined that the requested full record was found, the routine 800 continues to operation 808, where a determination is made as to whether the data field 518 has been set for the record to indicate that the variable has been deleted and the record is invalid. If the record is invalid, the routine 800 branches back to operation 804, where another search is made for the valid record. This may occur, for instance, if a variable was created, then deleted, then created again. The first record will be marked as deleted and the second record for the variable will be valid.

If, at operation 808, it is determined that the record is valid, as indicated by the contents of the data field 518, the routine continues from operation 808 to operation 812, where a determination is made as to whether the record has its data field 512 set thereby indicating that another data only record exists for the variable. If the data field 512 is set, the routine 800 branches to operation 814, where an attempt is made to locate the next data only record for the variable. The routine 800 then continues to operation 818.

At operation 818, a determination is made as to whether a next data only record was located for the variable. If so, the routine 800 branches back to operation 812. If not, the routine continues to operation 818, where an error is returned. In this manner, once a record for the variable has been found that does not have its data field 512 set (either the full record or the most recently created data only record for the variable), the routine continues from operation 812 to operation 816, where the value stored in the data field 606 for the current record is returned in response to the original request for the variable value. The routine then continues from operations 810, 816, and 820 to operation 822, where it ends.

Figure 9:
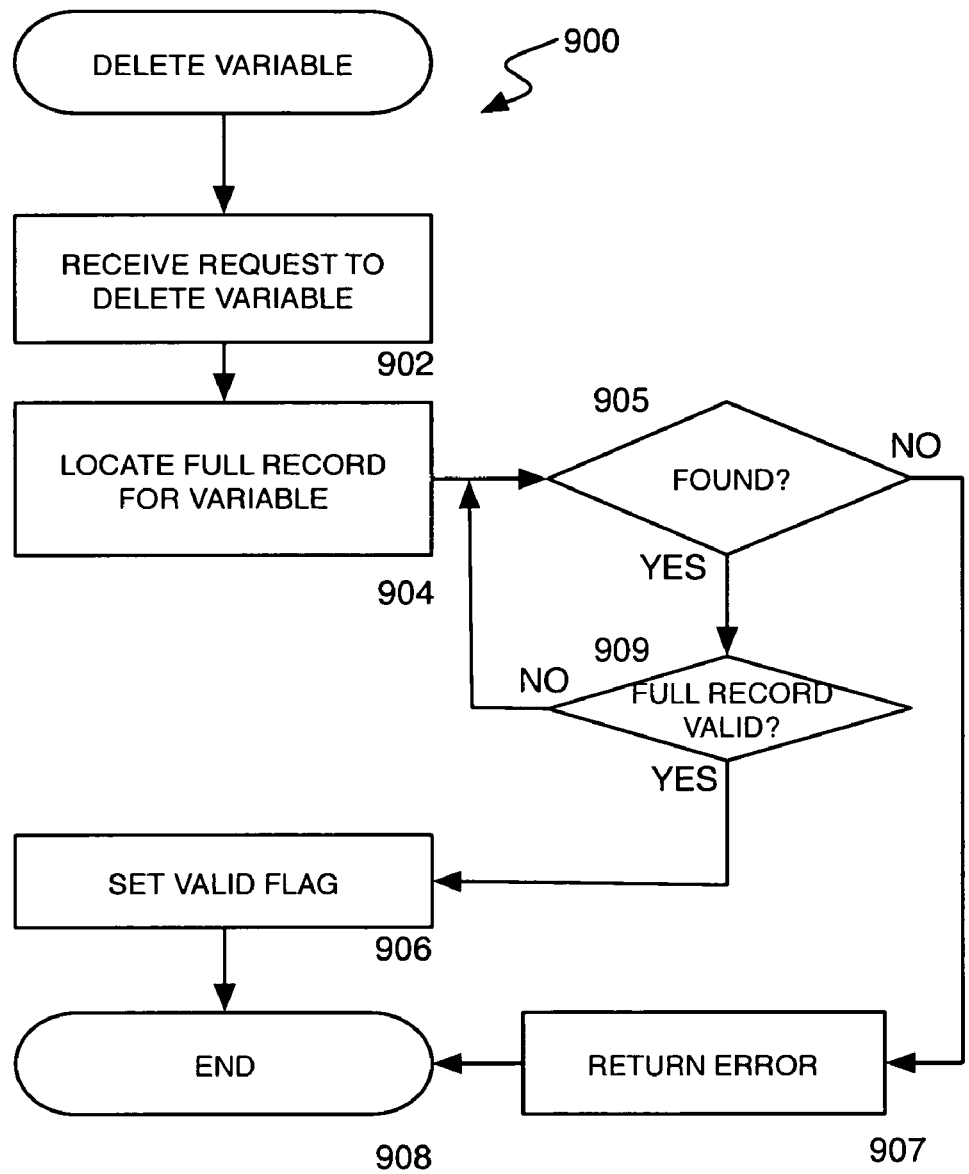

Referring now to FIG. 9, an illustrative routine 900 will be described for deleting a variable from the NVRAM 137. In particular, variable services 308 receives a request at operation 902 to delete a variable from the NVRAM 137. In response to the request, the routine 900 continues to operation 904, where an attempt is made to locate the full record for the variable by searching the NVRAM 137. From operation 904, the routine 900 branches to operation 905, where a determination is made as to whether the full record was found. If the full record was not found, the routine 900 branches to operation 907, where an error is returned in response to the request to delete the variable. If the full record is found, the routine 900 branches from operation 905 to operation 909, where a determination is made as to whether the record is valid. If the record is not valid, the routine 900 branches back to operation 905, where another search is performed. If the record is valid, the routine 900 continues from operation 909 to operation 906, where the data field 518 is set, thereby indicating that the variable is no longer valid. From operation 906, the routine 900 continues to operation 908, where it ends.

It should be appreciated that variable services 308 may, from time to time, perform a garbage collection process to eliminate any unnecessary memory usage. In particular, valid variable records having one or more data only records may be consolidated into a single full record. Similarly, invalid variable records that have been deleted may be removed from the NVRAM altogether. In this manner, the smallest amount of NVRAM necessary to store the variable records may be utilized.

It will be appreciated that embodiments of the present invention provide methods, systems, apparatus, and computer-readable medium for efficiently storing variables in a non-volatile memory. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for storing a variable in a non-volatile memory of a computing system executing an extensible firmware interface (EFI) firmware, the method comprising performing computer-implemented operations for:

receiving a request to store a variable in the non-volatile memory;

in response to the request, determining whether a record exists in the non-volatile memory for the variable;

in response to determining that a record does not exist in the non-volatile memory for the variable, creating a new full record for the variable in the non-volatile memory, the full record comprising a header and record information, wherein the header comprises a data field initialized to an erase polarity value of the non-volatile memory for storing a byte offset to a next variable record, a data field for storing a unique signature, a data field for storing data identifying the size of the new full record or a data only record, and a data field for storing one or more flags for the variable comprising a data field for storing data indicating whether a record comprises a full record or a data only record, a data field for storing data indicating whether the variable identified by a record is valid or has been deleted, a data field for storing data indicating a life span of the variable, a data field for storing data indicating whether a name for the variable is expressed using ASCII or UNICODE data, and a data field for storing data identifying a GUID for the variable identified by a record, and wherein the record information comprises a data field for storing either a GUID or an index to a second data field containing the GUID, a data field for storing a name for the variable, and a data field for storing a value for the variable, wherein creating a new full record further comprises determining whether a GUID for the variable has previously been stored, in response to determining that the GUID for the variable has previously been stored, populating the data field for storing data identifying a GUID with an index to the previously stored GUID, in response to determining that the GUID for the variable has not been previously stored, determining whether space exists within a non-volatile memory area for storing the GUID, in response to determining that space does exist within the non-volatile memory area for storing the GUID, storing the GUID at the end of the non-volatile memory area and populating the data field for storing data identifying a GUID with an index to the stored GUID, and in response to determining that space does not exist within the non-volatile memory area for storing the GUID, storing the GUID in the new record and setting a flag in the record indicating that the GUID is stored in the record; and in response to determining that a record does exist in the non-volatile memory for the variable, creating a new data only record in the non-volatile memory comprising a header and record information including a data field for storing a value for the variable and modifying the data field in the full record for storing the byte offset to an offset of the new data only record.

2. A method for retrieving a value of a variable stored in a non-volatile memory of a computing system executing an extensible firmware interface (EFI) firmware, the method comprising performing computer-implemented operations for:

receiving a request to retrieve the value of a variable stored in the non-volatile memory;

in response to the request, locating a full record for the variable stored in the non-volatile memory, the full record comprising a first data field for storing variable information in the non-volatile memory, the variable information comprising a header and record information, and wherein the record information comprises a data field for storing either a GUID or an index to a second data field containing the GUID, a data field for storing a name for the variable, and a data field for storing a value for the variable, and wherein the header comprises a data field for storing a unique signature for the first data field, a data field for storing data identifying the size of the first data field, a data field for storing an offset to a next first data field stored in the data structure and associated with the first data field, and a data field for storing one or more flags for a variable identified by the first data field;

determining whether the full record has a flag set indicating that the record is valid;

in response to determining that the flag is set indicating that the record is valid, determining whether one or more data only records also exist in the non-volatile memory for the variable, the data only record comprising a header and a data field for storing a value for the variable identified by the first data field;

in response to determining that one or more data only records also exist in the non-volatile memory, searching the non-volatile memory to locate the most recently created data only record;

reading the value of the variable from the most recently created data only record and returning the value in response to the request;

receiving a request to delete the variable; and in response to receiving the request to delete the variable, locating the full record for the variable stored in the non-volatile memory and in response to locating the full record, setting the flag to indicate that the record is invalid, thereby deleting the variable.

3. A computer storage medium having computer-executable instructions stored thereon which, when executed by a computer, cause the computer to:

receive a request to store a variable in a non-volatile memory;

in response to receiving the request, to determine whether a record exists in the non-volatile memory for the variable;

in response to determining that a record does not exist in the non-volatile memory for the variable, to create a new full record in the non-volatile memory for the variable in the non-volatile memory, the full record comprising a header and record information, wherein the header comprises a data field initialized to an erase polarity value of the non-volatile memory for storing a byte offset to a next variable record, a data field for storing a unique signature, a data field for storing data identifying the size of the new full record or data only record, and a data field for storing one or more flags for the variable comprising a data field for storing data indicating whether a record comprises a full record or a data only record, a data field for storing data indicating whether the variable identified by a record is valid or has been deleted, a data field for storing data indicating a life span of the variable, a data field for storing data indicating whether a name for the variable is expressed using ASCII or UNICODE data, and a data field for storing data identifying a GUID for the variable identified by a record, and wherein the record information comprises a data field for storing either a GUID or an index to a second data field containing the GUID, a data field for storing a name for the variable, and a data field for storing a value for the variable; and in response to determining that a record does exist in the non-volatile memory for the variable, to create a new data only record in the non-volatile memory comprising a header and record information including a data field for storing a value for the variable and to modify the data field in the full record for storing the byte offset to an offset of the new data only record.

4. A computer storage medium having computer-executable instructions stored thereon which, when executed by a computer, cause the computer to:

receive a request to retrieve the value of a variable stored in a non-volatile memory;

in response to receiving the request, to locate a full record for the variable stored in the non-volatile memory, the full record comprising a first data field for storing variable information in the non-volatile memory, the variable information comprising a header and record information, and the record information comprising a data field for storing either a GUID or an index to a second data field containing the GUID, a data field for storing a name for the variable, and a data field for storing a value for the variable, and the header comprising a data field for storing a unique signature for the first data field, a data field for storing data identifying the size of the first data field, a data field for storing an offset to a next first data field stored in the data structure and associated with the first data field, and a data field for storing one or more flags for a variable identified by the first data field;

determine whether the full record has a flag set indicating that the record is valid;

in response to determining that the flag is set indicating that the record is valid, to determine whether one or more data only records also exist in the non-volatile memory for the variable, the data only records comprising the header and a data field for storing a value for the variable identified by the first data field;

in response to determining that one or more data only records also exist in the non-volatile memory, to search the non-volatile memory to locate the most recently created data only record;

read the value of the variable from the most recently created data only record and to return the value in response to the request; and to receive a request to delete the variable;

in response to receiving the request, to locate the full record for the variable stored in the non-volatile memory and in response to locating the full record, to set the flag to indicate that the record is invalid, thereby deleting the variable.

5. An apparatus configured for storing a variable in a non-volatile random access memory, the apparatus comprising:

a central processing unit; and a non-volatile random access memory storing a firmware for execution on the central processing unit, the firmware configured to receive a request to store a variable in the non-volatile memory, to determine in response to the request whether a record exists in the non-volatile memory for the variable, to create a new full record in the non-volatile memory for the variable in response to determining that a record does not exist in the non-volatile memory for the variable, the full record comprising a header and record information, and wherein the header comprises a data field initialized to an erase polarity value of the non-volatile memory for storing a byte offset to a next variable record and wherein the record information comprises a data field for storing either a GUID or an index to a second data field containing the GUID, a data field for storing a name for the variable, and a data field for storing a value for the variable, and in response to determining that a record does exist in the non-volatile memory for the variable, the firmware configured to create a new data only record in the non-volatile memory comprising a header and record information including a data field for storing a value for the variable and to modify the data field in the full record for storing the byte offset to an offset of the new data only record, and the firmware being further configured to receive a request to retrieve the value of a variable stored in the non-volatile memory, to locate a full record for the variable stored in the non-volatile memory in response to receiving the request, to determine whether the full record has a flag set indicating that the record is valid, to determine whether one or more data only records also exist in the non-volatile memory for the variable in response to determining that the flag is set indicating that the record is valid, to search the non-volatile memory to locate the most recently created data only record, and to return the value of the variable from the most recently created data only record in response to the request.

* * * * *

UNITED STATES PATENT AND TRADEMARK OFFICE
CERTIFICATE OF CORRECTION

PATENT NO. : 7,558,804 B1 Page 1 of 1
APPLICATION NO. : 11/212198
DATED : July 7, 2009
INVENTOR(S) : Feliks Polyudov It is certified that error appears in the above-identified patent and that said Letters Patent is hereby corrected as shown below:

On the Title Page:
Item (75)
The inventor's name should read:

~~Feliks Polydov~~ Feliks Polyudov

Signed and Sealed this

Twenty-first Day of September, 2010

David J. Kappos
*Director of the United States Patent and Trademark Office*